Oct. 10, 1933.   C. A. BORNMANN   1,930,334
CAMERA BODY
Filed Jan. 4, 1932

INVENTOR.
CARL A. BORNMANN.

Patented Oct. 10, 1933

1,930,334

UNITED STATES PATENT OFFICE 1,930,334

CAMERA BODY

Carl A. Bornmann, Binghamton, N. Y., assignor to Agfa Ansco Corporation, Binghamton, N. Y., a corporation of New York Application January 4, 1932. Serial No. 584,730

12 Claims. (Cl. 95—32)

My invention relates to camera bodies and more particularly to camera frames of the folding pocket type such as, for example, shown in Patent No. 1,558,100 issued to Lew W. Lessler, October 12, 1925.

One of the objects of the present invention is to provide an improved construction of camera frames in which the parts are so assembled and related to each other as to provide a smooth outer surface, free from projections as well as a construction which will be absolutely light proof at all times.

A further object is to provide a camera frame of the above general character having relatively few parts which may be easily and cheaply assembled and which will be durable and substantial in construction.

A further object is to provide a camera frame of the above character adapted to provide a small compact space in the interior of the camera for the film spools as well as a relatively large recessed opening for receiving the bellows, lens and operating mechanism and the finder usually carried at the front of the bellows, when the same are in collapsible relation.

Other objects will be in part obvious and in part hereinafter pointed out in connection with the accompanying sheet of drawing illustrating one of various possible embodiments of the invention and in the several views of which corresponding parts are indicated by similar reference characters.

Figure 1:
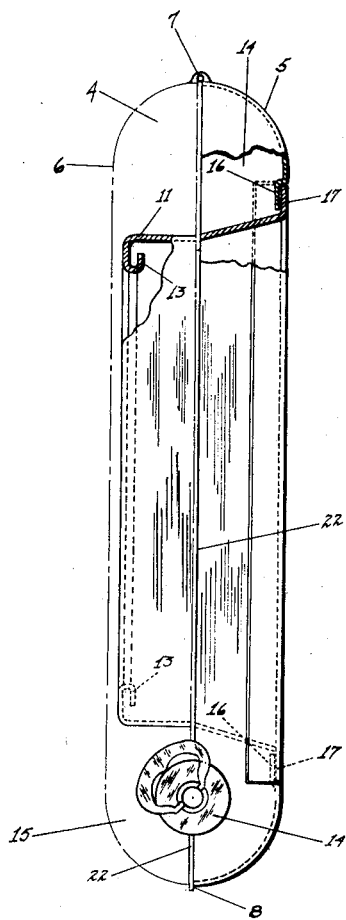
Figure 1 is a side elevational view partly in section showing such parts of the camera frame as is necessary to understand the invention.

Referring to the drawing, and more particularly to Figure 1, 5 indicates one half of the camera frame or shell, the other half 6 being indicated in dotted lines. As herein shown the camera is closed, the parts 5 and 6 being hinged together at 7 along one end edge and provided at the opposite edge 8 with any suitable form of catch or securing means (not shown) as desired.

Figure 2:
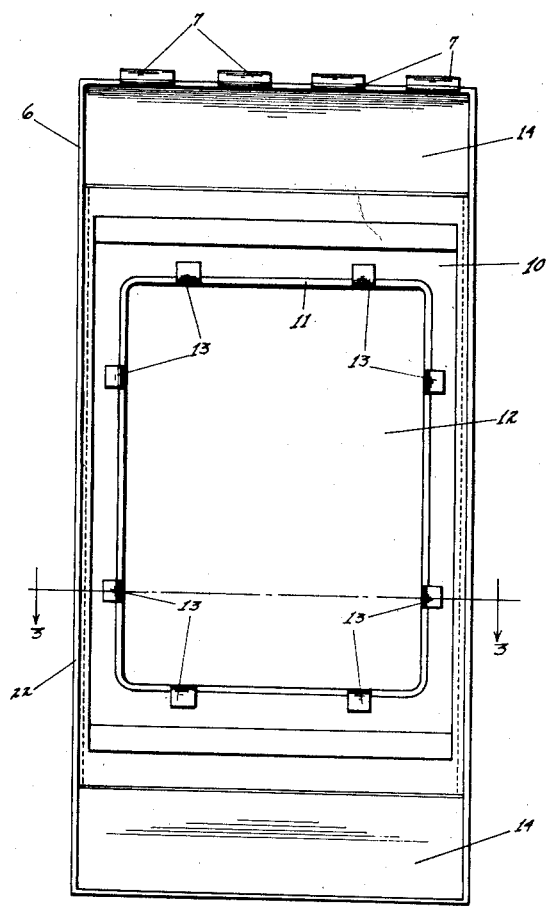
Figure 2 is a similar view taken at right angles to Figure 1.

The member 5 has a relatively large rectangular opening 10, as shown in Figure 2, and in this opening is a rectangular frame member 11 open at its central part as indicated at 12. This provides a bellows chamber in which the bellows, lens and lens operating mechanism and finder are adapted to be housed when the camera is collapsed, the bellows being attached by means of bent over prongs 13 as shown in Figure 2.

The film spools are adapted to be housed in the semi-circular chambers 14 at each end of the camera casing and the winding mechanism for one of the spools extends outwardly through the key opening indicated at 15.

These parts are all of old and well known construction and form no part of the present invention except insofar as the particular manner of mounting and assembling the same is concerned as will now be more fully described.

It will be noted that the rectangular member 11 is provided with an inclined wall portion 12 at each end, thereby to more closely fit and conform to the curvature of the film spools housed in the chamber 14. This inclined wall also provides a relatively larger space than heretofore for the bellows, lens and lens operating mechanism which is adapted to be collapsed into this recess or chamber when the camera is in folded position.

It will be noted that the frame member 5 adjacent the rectangular member 11 is provided with a countersunk flange 16 at each end adapted to cooperate with end flanges 17 at each end of the rectangular member 11. Thus, in assembling the parts the flange 17 lies flush with the outer surface of the part 5 and is adapted to be spot welded or otherwise permanently secured to the flange 16, thereby to provide a smooth even finish as well as an absolute light tight joint.

By reference to Figure 2 it will be seen that the side walls of the member 11 are substantially straight and terminate in a bent over flange 18 which cooperate with a flange 20 countersunk with relation to the side wall of the camera frame 21. These flanges 18 and 20 are also spot welded or otherwise permanently secured in operative and assembled relation, as shown, to provide a light tight joint along the entire side. By having the flange 20 countersunk, as indicated, then the outer surface of the flange 18 lies flush with the surface 21 and provides a smooth even appearance.

Figure 3:
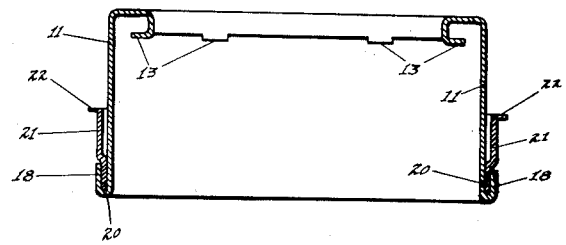
Figure 3 is a detail sectional view taken substantially along the line 3—3 in Figure 2.

In practice it is customary to cover the outer surface of the camera frame with fabric, artificial leather, or the like, and when so covered it is impossible to detect the joints either at 17 or 18. The camera frame is preferably provided with lateral flanges 22 as indicated in Figure 3, which permits the fabric or leather to lie flush therewith, thus preventing accidental tearing or loosening of the fabric at these points. Also, the flange 22 is, of course, adapted to cooperate with a similarly shaped flange on the other half 6 of the camera frame when the same is closed.

From the above it will be seen that the present invention contemplates primarily a simple, compact and relatively inexpensive frame of the character set forth in which the parts are so assembled and related as to provide not only a smooth surface at all points over which to lay the fabric or leather but absolutely light tight joints, thus preventing damage to the film contained within the camera.

Of course, changes may be made in details of construction and arrangement of parts without departing from the spirit and scope of my invention. I do not limit myself, therefore, to the exact form herein shown and described other than by the appended claims.

I claim:

1. In a camera frame of the character described, in combination, an outer shell, a bellows chamber mounted therein presenting a rectangular member having flanges at its outer side permanently secured to the adjacent surfaces of the camera shell.

2. In a camera frame of the character described, in combination, an outer shell, a bellows chamber mounted therein presenting a rectangular member having flanges at its outer side permanently secured to the adjacent surfaces of the camera shell, said camera shell being countersunk to receive the flanges of the bellows chamber member.

3. In a camera frame of the character described, in combination, a camera shell having a central opening through which the bellows are adapted to extend, the end edges of said opening having countersunk flanges and the side walls of the shell having countersunk portions.

4. In a camera frame of the character described, in combination a shell having a central opening through which the bellows are adapted to extend, the end edges of said opening having countersunk flanges and the side walls of the shell having countersunk portions, a bellows chamber of substantially rectangular shape mounted in said opening having end flanges adapted to cooperate with the countersunk flanges and side wall flanges adapted to coact with the countersunk portions of the side frame.

5. In a camera frame of the character described, in combination, an outer shell having a central opening through which the bellows are adapted to extend, the end edges of said openings having countersunk flanges and the side walls of the shell having countersunk portions, a bellows chamber of substantially rectangular shape mounted in said opening having end flanges adapted to cooperate with the countersunk flanges and side wall flanges adapted to coact with the countersunk portions of the side frame, said flanges being spot welded to provide a light tight joint.

6. In a camera frame of the character described, in combination, an outer shell having a central rectangular opening in one side wall through which the camera bellows are adapted to be extended, the end edges of said openings being countersunk, a rectangular bellows chamber having end flanges coacting with said first mentioned end flanges, and the end walls of said bellows chamber being inclined towards the end of said camera shell.

7. In a camera frame of the character described, in combination, an outer shell having a central rectangular opening in one side wall through which the camera bellows are adapted to be extended, the end edges of said openings being countersunk, a rectangular bellows chamber having end flanges coacting with said first mentioned end flanges, and the end walls of said bellows chamber being inclined towards the end of said camera shell, the side walls of said bellows chamber being substantially straight and having a turned over flange coacting with the side wall of the camera shell.

8. In a camera frame of the character described, in combination, an outer shell having a central rectangular opening in one side wall through which the camera bellows are adapted to be extended, the end edges of said openings being countersunk, a rectangular bellows chamber having end flanges coacting with said first mentioned end flanges, and the end walls of said bellows chamber being inclined towards the end of said camera shell, the side walls of said bellows chamber being substantially straight and having a turned over flange coacting with the side wall of the camera shell, and means in said bellows chamber for attaching the bellows thereto.

9. In a camera frame of the character described, in combination, a substantially rectangular camera shell having a relatively large central opening, a bellows chamber mounted in said opening, means for securing the bellows to said chamber, the end walls of said chamber being inclined towards the end of the camera shell.

10. In a camera frame of the character described, in combination, a substantially rectangular camera shell having a relatively large central opening, a bellows chamber mounted in said opening, means for securing the bellows to said chamber, the end walls of said chamber being inclined towards the end of the camera shell, said walls being provided with laterally extending flanges adapted to be permanently secured to the adjacent parts of the camera shell.

11. In a camera frame of the character described, in combination, a substantially rectangular camera shell having a relatively large central opening, a bellows chamber mounted in said opening, means for securing the bellows to said chamber, the end walls of said chamber being inclined towards the end of the camera shell, said walls being provided with laterally extending flanges adapted to be permanently secured to the adjacent parts of the camera shell, the side walls of said bellows chamber having bent over flanges to cooperate with the side walls of the camera shell.

12. In a camera frame of the character described, in combination, a substantially rectangular camera shell having a relatively large central opening, a bellows chamber mounted in said opening, means for securing the bellows to said chamber, the end walls of said chamber being inclined towards the end of the camera shell, said walls being provided with laterally extending flanges adapted to be permanently secured to the adjacent parts of the camera shell, the side walls of said bellows chamber having bent over flanges to cooperate with the side walls of the camera shell, said flanges being spot welded to the camera shell to provide a light tight joint.

CARL A. BORNMANN.